(12) United States Patent
Fujita

(10) Patent No.: US 7,234,150 B2
(45) Date of Patent: Jun. 19, 2007

(54) METHOD AND APPARATUS FOR CONTROLLING A DISK DRIVE

(75) Inventor: Shinji Fujita, Daito (JP)

(73) Assignee: Funai Electric Co., Ltd., Daito-Shi, Osaka (JP)

( * ) Notice: Subject to any disclaimer, the term of this patent is extended or adjusted under 35 U.S.C. 154(b) by 455 days.

(21) Appl. No.: 10/394,788

(22) Filed: Mar. 21, 2003

(65) Prior Publication Data

US 2003/0179660 A1 Sep. 25, 2003

(30) Foreign Application Priority Data

Mar. 22, 2002 (JP) ............................ 2002-081136

(51) Int. Cl.
*G11B 17/03* (2006.01)

(52) U.S. Cl. .................. 720/604; 720/608; 369/30.27

(58) Field of Classification Search ..................... None
See application file for complete search history.

(56) References Cited

U.S. PATENT DOCUMENTS

| | | | | |
|---|---|---|---|---|
| 5,014,258 A | * | 5/1991 | Takemasa et al. | 369/30.84 |
| 5,146,451 A | * | 9/1992 | Kang | 720/700 |
| 5,265,083 A | * | 11/1993 | Ishii et al. | 720/605 |
| 5,726,828 A | * | 3/1998 | Kakuta et al. | 360/98.01 |
| 5,757,583 A | * | 5/1998 | Ogawa et al. | 720/706 |
| 6,295,266 B1 | * | 9/2001 | Lee et al. | 720/608 |

FOREIGN PATENT DOCUMENTS

| | | |
|---|---|---|
| JP | 60-80560 | 6/1985 |
| JP | 63-13459 | 1/1988 |
| JP | 1-92958 | 4/1989 |
| JP | 1-185872 | 7/1989 |
| JP | 2-96977 A | 4/1990 |
| JP | 3-95609 | 4/1991 |
| JP | 8-203180 | 8/1996 |

OTHER PUBLICATIONS

Patent Abstracts of Japan, Publication No. 01-185872, Jul. 25, 1989, 1 pg.
Patent Abstracts of Japan, Publication No. 08-203180, Aug. 9, 1996, 1 pg.
Japanese Patent Office Utility Model Laying-Open Gazette, Laying-Open No. 63-13459, Jan. 28, 1988, 8 pgs.
Japanese Office Action dated Feb. 2, 2005 and English Translation; Japanese Application No. 2002-081136 (4 pages).

(Continued)

*Primary Examiner*—Tan Dinh
(74) *Attorney, Agent, or Firm*—Osha Liang LLP

(57) ABSTRACT

When an action for turning off the power of a host computer is performed, the host computer transmits control information to a disk drive to the effect that chucking should be canceled. Accordingly, the disk drive cancels chucking of a disk and transmits information to the host computer to the effect that cancel has been completed. Receiving the information to the effect that chucking has been canceled, the host computer terminates a disk drive application, confirms that all of the started applications are completed, and then terminates OS (Operating System).

6 Claims, 11 Drawing Sheets

OTHER PUBLICATIONS

Japanese Patent office Utility Model Laying-Open Gazette, Laying-Open No. 60-80560 dated Jun. 4, 1985 (2 pages).
Patent Abstracts of Japan; Publication No. 03-095609 dated Apr. 22, 1991 (1 page).
Patent Abstracts of Japan; Publication No. 01-092958 dated Apr. 12, 1989 (1 page).
Patent Abstracts of Japan, Publication No. 02-096977, Publication Date: Apr. 9, 1990, 1 page.

* cited by examiner

METHOD AND APPARATUS FOR CONTROLLING A DISK DRIVE

BACKGROUND OF THE INVENTION

1. Field of the Invention

The present invention relates to control of a disk drive. In particular, the present invention relates to control of a disk drive that is characterized by a process upon power-off of a control device which controls operation of the disk drive.

2. Description of the Background Art

As one of the techniques concerning control of the disk drive, a technique has been proposed that is used for unlocking a disk-mounted tray to remove the disk which is left contained in the disk drive after power supply to the disk drive is stopped. This conventional technique is of interest to the present invention as the invention aims to permit a disk to be removed that is left contained in the disk drive after the control device controlling operation of the disk drive is powered off.

One example of such a conventional technique is disclosed in Japanese Patent Laying-Open No. 1-185872, according to which a disk in a disk drive is permitted to be removed even upon a drop in supply voltage, by control to unlock a disk-loading tray. Japanese Utility Model Laying-Open No. 63-13459 discloses a technique of disengaging a tray of a disk drive in synchronization with turn-off of a power-supply switch. Further, Japanese Patent Laying-Open No. 8-203180 discloses a technique of canceling chucking of a disk by chucking cancel means for the disk. Specifically, a disk drive has a door provided on the front side of a tray as well as press means on the door, the press means pressing the chucking cancel means to cancel chucking of the disk.

The conventional techniques as discussed above, however, require, for the disk drive, members for detecting the drop in supply voltage, members constituting a mechanism for disengaging the tray in synchronization with turn-off of the power-supply switch, or members constituting the door and press means for example. In other words, the cost of the disk drive increases due to the need for these members.

SUMMARY OF THE INVENTION

The present invention has been made from consideration of the state as described above. One object of the present invention is to provide a manner of controlling a disk drive for permitting a disk to be removed that is left contained in the disk drive even after power supply to a control device controlling the disk drive is stopped.

A control device for a disk drive is provided according to one aspect of the present invention, the control device controlling the disk drive including a rotatably structured turn table, a clamper rotatably holding a disk by holding the disk between the turn table and the clamper, and a control unit controlling respective operations of the turn table and the clamper. The control device starts an application for controlling the disk drive when power of the control device is turned on, instructs the disk drive to cause the control unit to cancel the holding of the disk by the turn table and the clamper when the power of the control device is turned off, and terminates the application for controlling the disk drive when the control device receives information from the disk drive to the effect that the holding of the disk has been canceled.

A control method for a disk drive is provided according to one aspect of the present invention, the disk drive including a rotatably structured turn table operating under control by information transmitted from a control device, a clamper rotatably holding a disk by holding the disk between the turn table and the clamper, and a control unit controlling respective operations of the turn table and the clamper. The method includes the steps of starting an application for controlling the disk drive when power of the control device is turned on, instructing the disk drive to cause the control unit to cancel the holding of the disk by the turn table and the clamper when the power of the control device is turned off, and terminating the application for controlling the disk drive when information is received from the disk drive to the effect that the holding of the disk has been cancelled.

A program product for controlling a disk drive is provided according to one aspect of the present invention, the disk drive including a rotatably structured turn table operating under control by information transmitted from a control device, a clamper rotatably holding a disk by holding the disk between the turn table and the clamper, and a control unit controlling respective operations of the turn table and the clamper. The control device executes, according to the program of the program product, the steps of starting an application for controlling the disk drive when power of the control device is turned on, instructing the disk drive to cause the control unit to cancel the holding of the disk by the turn table and the clamper when the power of the control device is turned off and terminating the application for controlling the disk drive when information is received from the disk drive to the effect that the holding of the disk has been cancelled.

A recording medium according to one aspect of the present invention has the program of the above-described program product for controlling the disk drive that is recorded on the recording medium.

According to one aspect of the present invention, when power of the control device which controls operation of the disk drive is turned off, the control device instructs the disk drive to cancel the holding of the disk between the turn table and the clamper. When the power of the control device is turned off, the control device terminates the application for controlling the disk drive after the holding of the disk is canceled.

A control device for a disk drive is provided according to another aspect of the present invention, the control device controlling the disk drive including a chucking member rotatably holding a disk and a chucking control unit controlling operation of the chucking member. The control device causes the chucking control unit to cancel the holding of the disk by the chucking member when power of the control device is turned off.

A control method for a disk drive is provided according to another aspect of the present invention, the disk drive including a chucking member operating under control by information transmitted from a control device and rotatably holding a disk, and a chucking control unit controlling operation of the chucking member. The control method includes the step of causing the chucking control unit to cancel the holding of the disk by the chucking member when power of the control device is turned off.

A program product for controlling a disk drive is provided according to another aspect of the present invention, the disk drive including a chucking member operating under control by information transmitted from a control device and rotatably holding a disk, and a chucking control unit controlling operation of the chucking member. The chucking control unit executes, according to the program of the program product, the step of canceling the holding of the disk by the chucking member when power of the control device is turned off.

A recording medium according to another aspect of the present invention has the program of the above-described program product for the disk drive that is recorded on the recording medium.

According to another aspect of the present invention, when power of the control device which controls operation of the disk drive is turned off, the disk drive is controlled to cancel holding of the disk by the chucking member.

According to the present invention as discussed above, a disk can be removed that is left contained in the disk drive after supply of power to the control device controlling the disk drive is stopped, without additional cost for the disk drive.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

As one embodiment of the present invention, an exemplary disk drive with its operation controlled according to the present invention is described.

Control Block Diagram of Disk Drive

Figure 1:
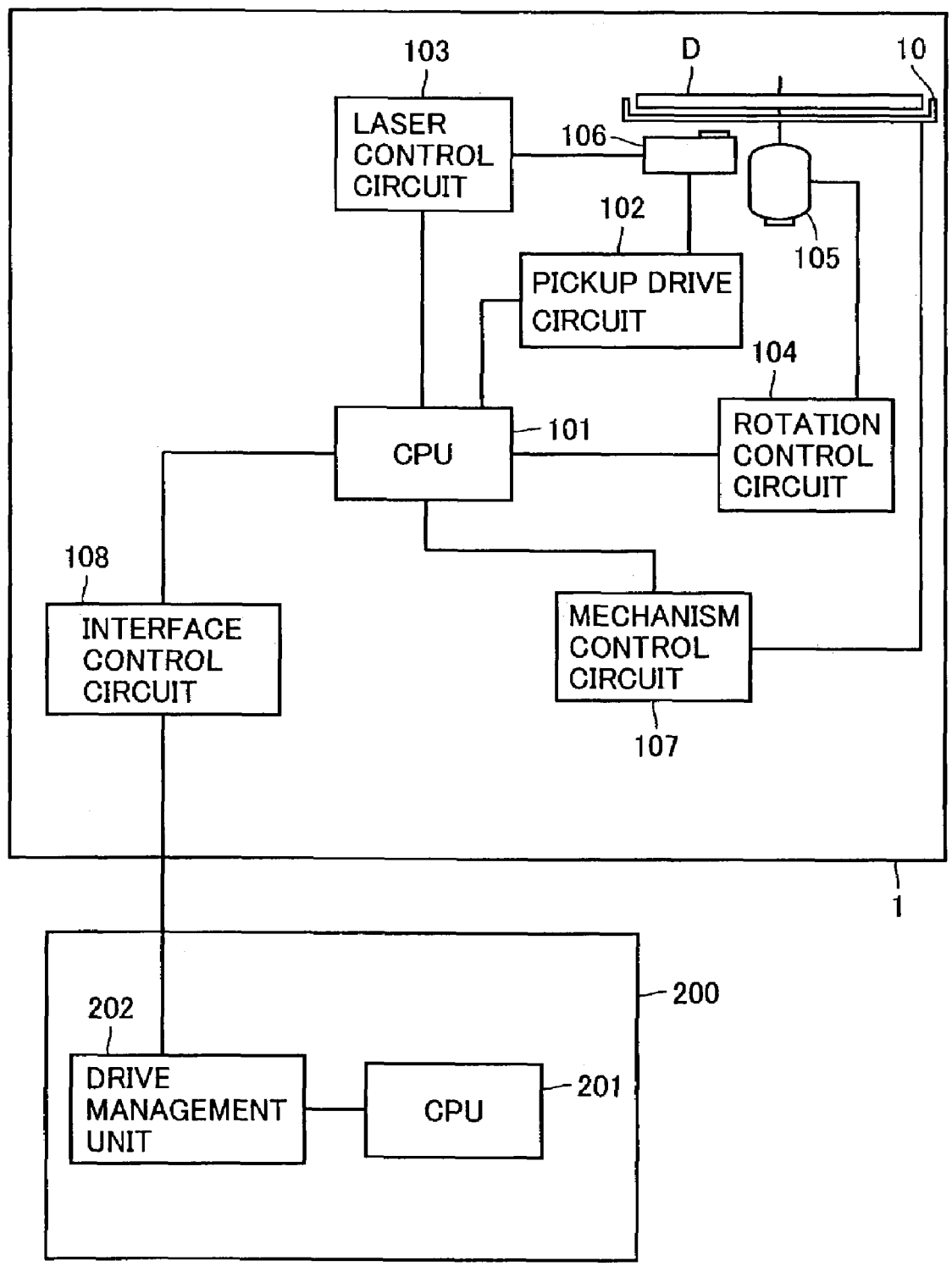
FIG. 1 is a control block diagram of a disk drive as well as a host computer to which the disk drive is connected according to one embodiment of the present invention.

Referring to FIG. 1, a disk drive 1 includes a CPU (central processing unit) 101, a pickup drive circuit 102, a laser control circuit 103, a rotation control circuit 104, a motor 105, a laser pickup 106, a mechanism control circuit 107, an interface circuit 108 and a disk tray 10 on which a disk D is mounted. Disk drive 1 is connected via interface circuit 108 to an external host computer 200.

Disk D, a CD (compact disk), for example, is put into disk drive 1 and then CPU 101 instructs rotation control circuit 104 to control rotation of motor 105 to start a spin-up operation. CPU 101 further instructs pickup drive circuit 102 to drive laser pickup 106 to read data from disk D. The data read from disk D is supplied to laser control circuit 103 and converted into an electric signal which is transmitted via interface control circuit 108 to host computer 200.

Host computer 200 includes a CPU 201 executing a control operation in host computer 200, and a drive management unit 202 controlling disk drive 1 according to a signal from CPU 201. Control information is sent by CPU 201 to disk drive 1 via drive management unit 202 for controlling operation of disk drive 1.

Structure of Disk Drive

Figure 2:
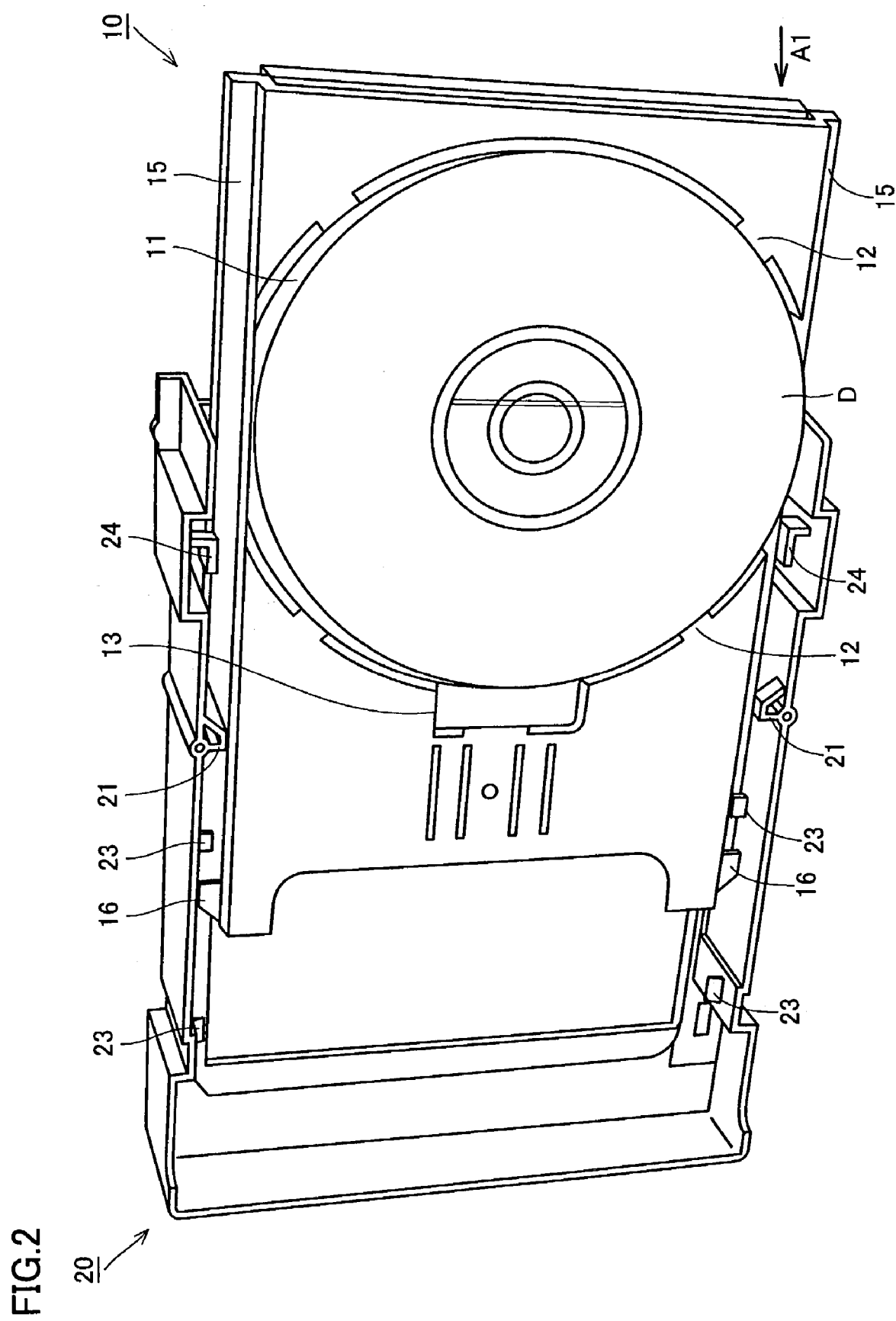
FIG. 2 is a perspective view of the disk drive in FIG. 1 for illustrating a loading operation in which the disk drive is engaged.
Figure 3:
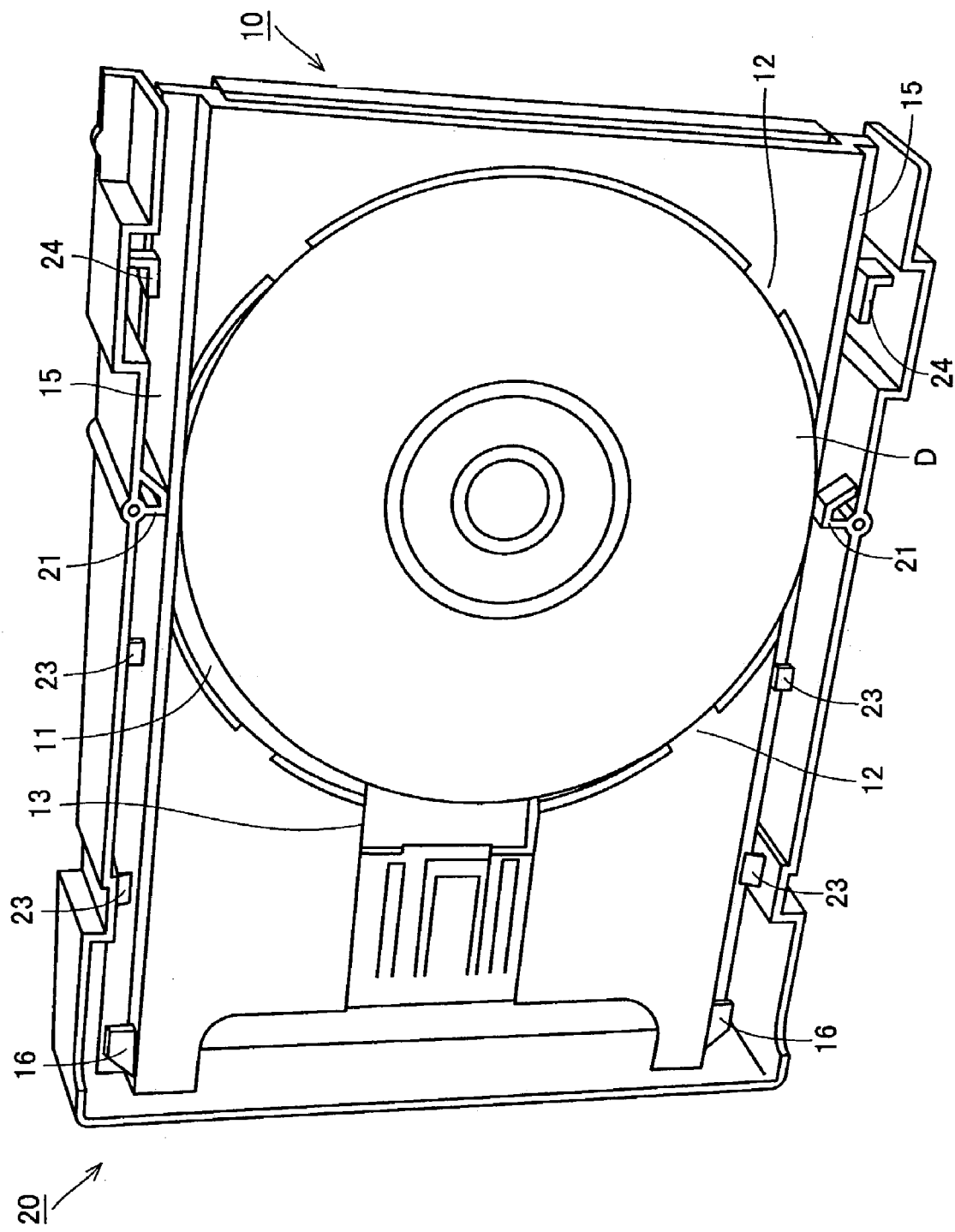
FIG. 3 is a perspective view of the disk drive in FIG. 1, for illustrating the loading operation, FIG. 3 showing a state after the loading operation and a centering operation.

Referring now to FIGS. 2 and 3, disk drive 1 has its structure as described below.

FIG. 2 shows a state in which a loading operation is being performed, and FIG. 3 shows a state after the loading operation and a centering operation. Here, the loading operation refers to an operation for putting disk D into disk drive 1 for reading information from disk D.

Disk drive 1 has a disk tray 10 for conveying disk D into a box-shaped body (not shown) and a frame 20 which movably supports disk tray 10. Respective movements of disk tray 10 and frame 20 are controlled by mechanism control circuit 107.

Disk tray 10 has a depressed part 11 on its mount side on which disk D is mounted, the depressed part 11 being shaped to be partially larger than the outline of disk D, and has lugs 12 placed at predetermined positions on the perimeter of depression 11 for preventing disk D from being dropped. Moreover, disk tray 10 has an opening 13 at a predetermined position. Opening 13 is provided to have a part which corresponds to the central part of the mounted disk D. In addition, disk tray 10 has a guide 15 having a guide groove which engages with a rail of frame 20. Disk tray 10 further has a stopper 16 for preventing disk tray 10 from being opened when the tray reaches a full-open position.

Frame 20 includes the rail (not shown) engaging with the guide groove of disk tray 10 as described above, an engagement piece 23 engaging with guide 15 of disk tray 10 from above, and a stopper 24 to be in contact with stopper 16 of disk tray 10. Further, frame 20 includes projections 21 for centering, at a chucking position, disk D contained in the body of disk drive 1.

Figure 4:
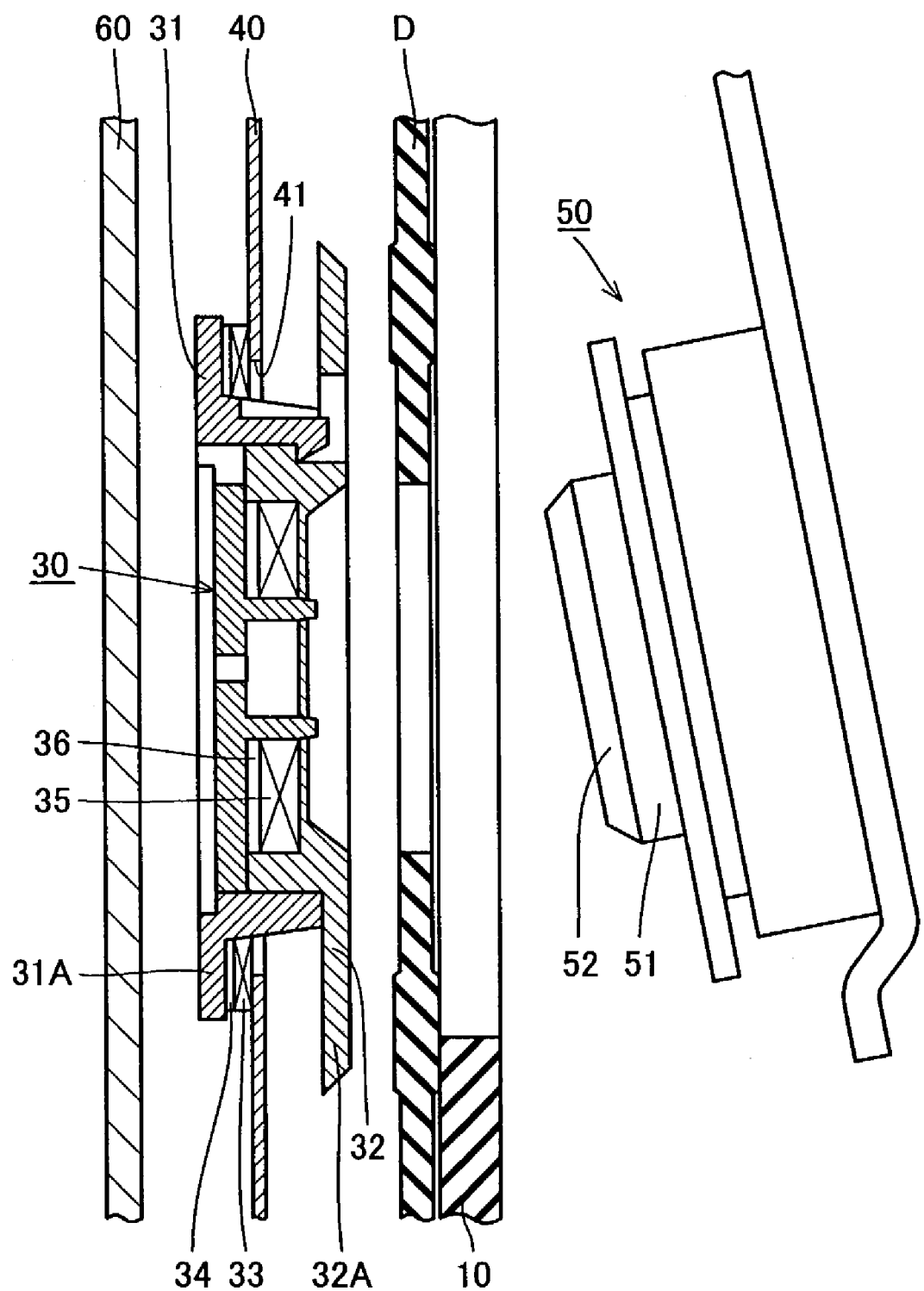
FIG. 4 is a schematic cross sectional view illustrating a clamper and its neighboring structure of the disk drive in FIG. 1.
Figure 5:
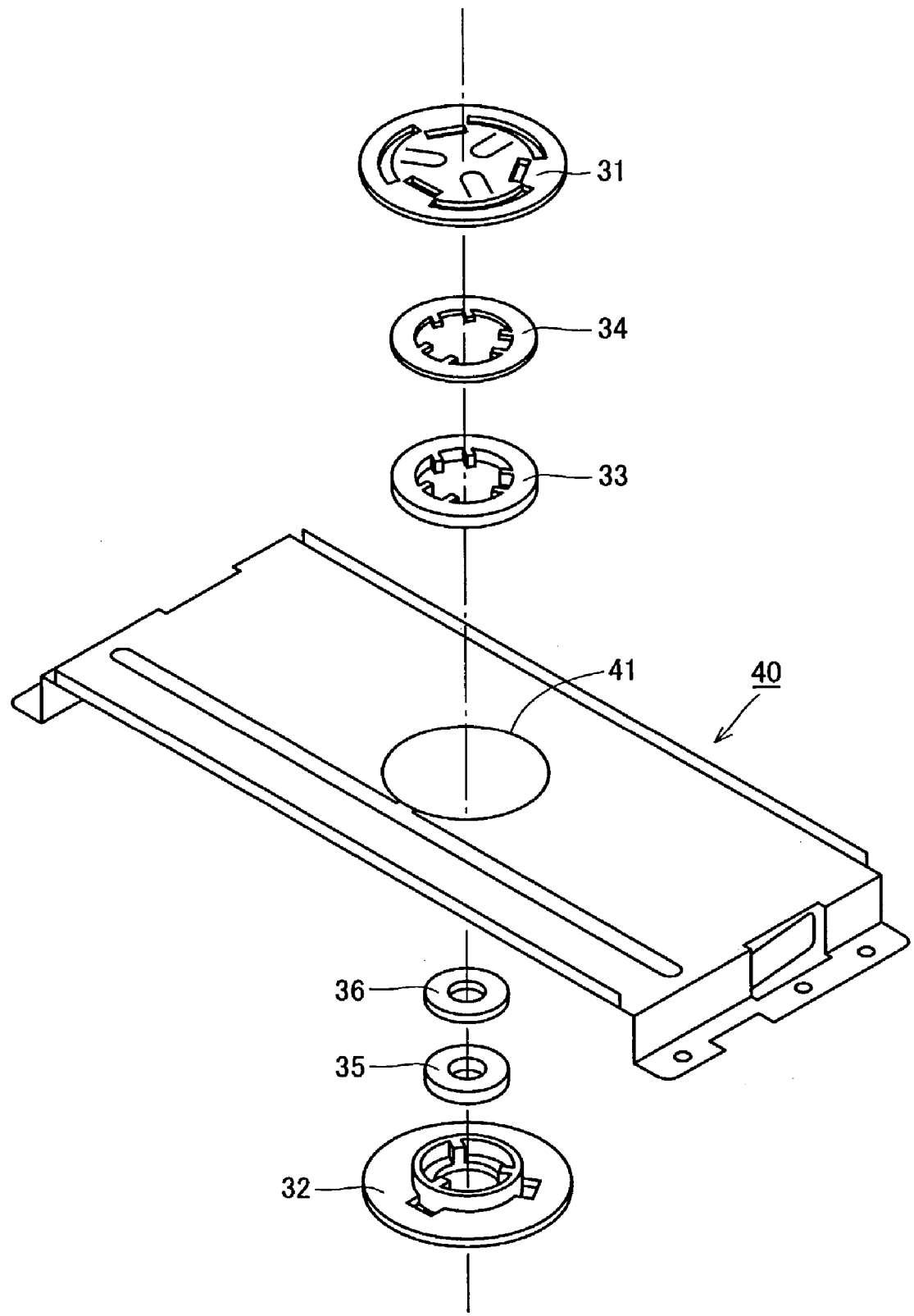
FIG. 5 is an exploded perspective view of the clamper and a clamper-support member of the disk drive in FIG. 1.

FIG. 4 is a schematic cross sectional view illustrating a clamper and its neighboring structure of disk drive 1, and FIG. 5 is an exploded perspective view illustrating a structure for fitting the clamper in a clamper support member. FIG. 4 shows a state after the loading operation and a centering operation described hereinbelow.

As shown in FIG. 4, disk D is mounted on the mount side of disk tray 10, and clamper 30 is provided to face an opening at the central part of disk D. Clamper 30 is constituted of an upper member 31 and a lower member 32 that are placed on respective sides of clamper support member 40 to be fit on each other in an clamper-fit opening 41 of clamper support member 40 and thus clamper 30 and clamper support member 40 are coupled together (see FIG. 5). Here, clamper support member 40 is formed by pressforming of a sheet-like member made of such a magnetic material as metal, and is secured to frame 20 at a predetermined distance from disk tray 10.

Upper member 31 and lower member 32 constituting clamper 30 are made of non-magnetic material (e.g. synthetic rubber) and each have an outer shape having a projection. Upper member 31 and lower member 32 are fit on each other with respective projections facing each other. Thus, clamper 30 is not completely secured to clamper support member 40 but is movable by the gap between a flange 31A of upper member 31 and a flange 32A of lower member 32 in the direction perpendicular to the main side of disk D.

Referring to FIG. 5, when upper member 31 and lower member 32 of clamper 30 are fit on each other, a second annular magnet 35 and a yoke 36 are arranged between upper member 31 and lower member 32. The second magnet 35 is permanent magnet and the direction of the magnetic field (direction of magnetization) thereof is substantially perpendicular to the main side of disk D. Further, a first annular magnet 33 is fit on and attached to flange 31A of upper member 31 with an adhesive tape 34. The first magnet 33 is also permanent magnet and the direction of the magnetic field is substantially the same as that of the second magnet 35 mentioned above.

As shown in FIG. 4, a side plate 60 of the box-shaped body is provided on the side opposite to disk tray 10 relative to clamper 30. In addition, a turn table 50 is provided on the side opposite to clamper 30 relative to disk tray 10. Turn table 50 includes a disk-holding unit 51 and a disk guide 52. In a chucking operation described below, disk D is guided by disk guide 52 to be fit on disk-holding unit 51.

Loading Operation and Centering Operation

Referring to FIGS. 2 and 3, a loading operation and a centering operation of disk drive 1 are described. When disk tray 10 is in a full-opened state, a user fits disk D in depression 11 on the disk-mount side of disk tray 10. At this time, disk D is mounted into depression 11 without being obstructed by lugs 12 since lugs 12 provided on disk tray 10 are placed slightly outside the perimeter of disk D. Disk D mounted on depression 11 is then lowered by its own weight and inserted into the space formed by lugs 12 and the disk-mount side of disk tray 10, and disk D is held in its upright position.

Disk tray 10 is then drawn into disk drive 1 in the direction indicated by arrow A1 in FIG. 2. At this time, the lower end of disk D contacts and climbs over projections 21 provided on frame 20 as shown in FIG. 3. Accordingly, disk D is lifted. The height of projections 21 is designed to allow disk D to reach a chucking position and thus centering of disk D is accomplished. In this way, a loading operation and a chucking operation are carried out simultaneously.

In disk drive 1, as clamper 30 is attracted to clamper support member 40 by the magnetic force of the first magnet 33 fit in clamper 30, clamper 30 is located at the position closest to disk tray 10 in the range in which clamper 30 is movable. Therefore, even if disk D inclines due to any impact at the time when disk D which has been caught in lugs 12 of disk tray 10 and accordingly held in its upright position is moved to climb over projections 21 used for centering and separate from lugs 12, disk D is prevented from being dropped from disk tray 10. Disk D is thus surely prevented from being dropped, and the loading operation is performed smoothly.

Chucking Operation and Chucking Cancel Operation

Referring now to FIGS. 6A, 6B, 7A and 7B, a chucking operation and a chucking cancel operation are described. It is noted that these drawings show only the principal components associated with the chucking and chucking cancel operations and thus other irrelevant parts are not shown therein.

Figure 6A:
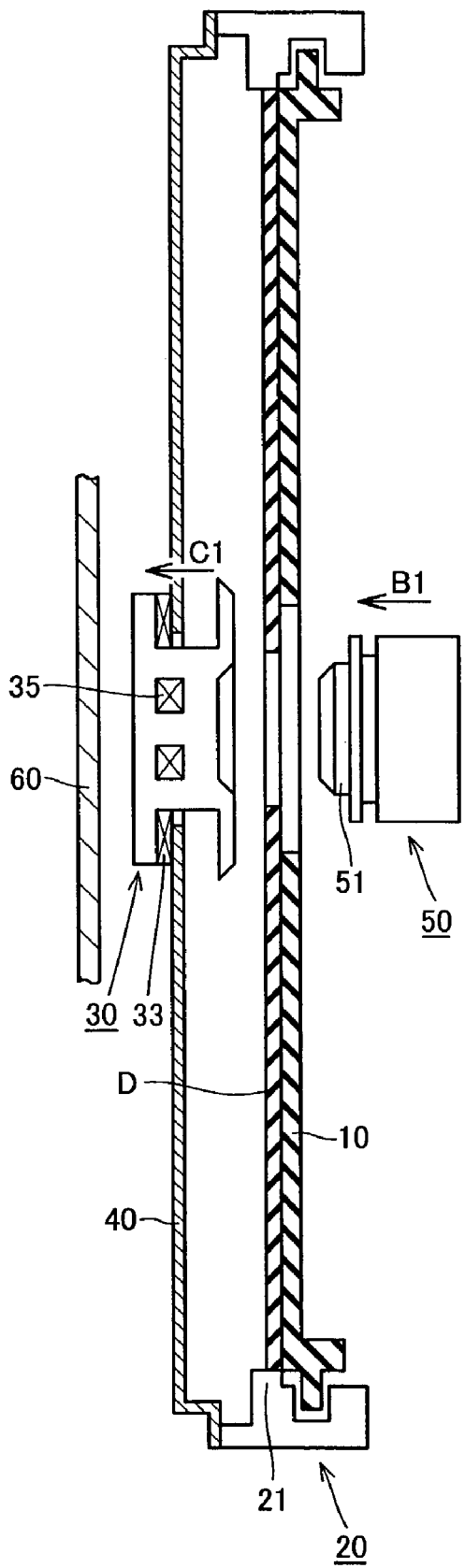
FIGS. 6A and 6B each show a schematic cross sectional view illustrating a chucking operation of the disk drive in FIG. 1.
Figure 6B:
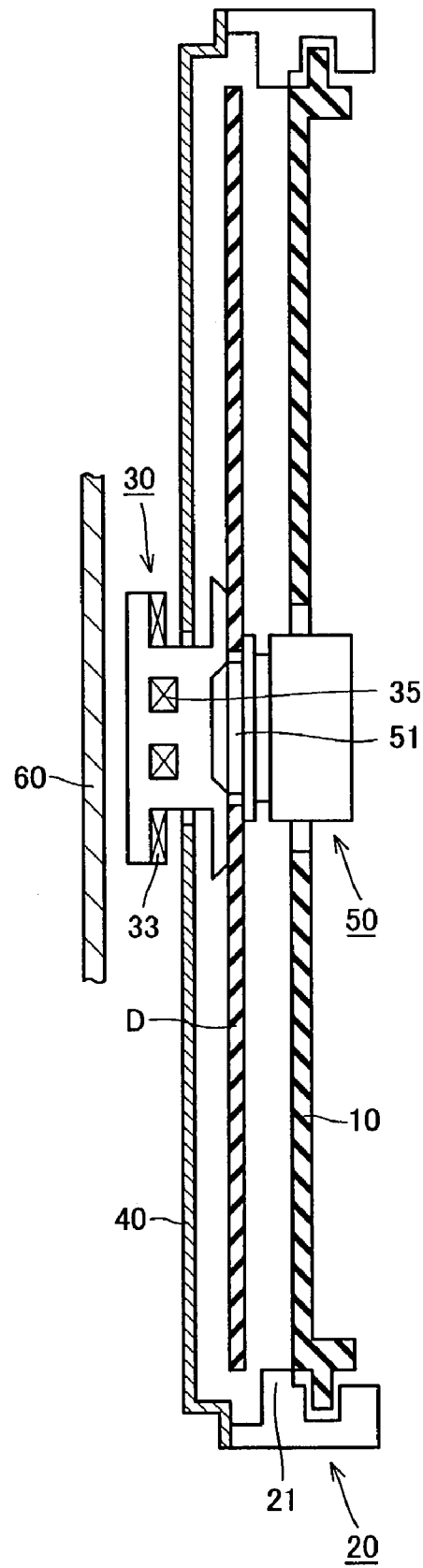

Referring first to FIGS. 6A and 6B, the chucking operation is described. Disk D conveyed into disk drive 1 by disk tray 10 is set at the chucking position through the centering operation discussed above. As shown in FIG. 6A, prior to the chucking operation, clamper 30 is located at the position closest to disk tray 10 in the range in which clamper 30 is movable. This is because the magnetic attraction force of the first magnet 33 fit on flange 31A of clamper 30 draws clamper 30 onto clamper support member 40.

The chucking operation is started and then turn tale 50 starts moving from the rear side of disk tray 10 in the direction indicated by arrow B1 in FIG. 6A, and passes through opening 13 of disk tray 10 to reach disk D. As turn table 50 reaches disk D, disk guide 52 of turn table 50 is inserted into the opening at the center of disk D. Disk D is then guided by disk guide 52 to be fit on disk holding unit 51 of turn table 50. After this, turn table 50 still continues moving to push up disk D and lift disk D off from disk tray 10.

Turn table 50 then reaches clamper 30 and clamper 30 is attracted to and contacts turn table 50 by the magnetic attraction force of the second magnet 35 fit in clamper 30. Accordingly, disk D is held between clamper 30 and turn table 50 to be chucked. Still after this, turn table 50 continues moving toward side plate 60 (in the direction of arrow C1 in FIG. 6A until turn table 50 reaches a position which enables disk D to safely rotate.

In this way, as shown in FIG. 6B, disk D is lifted off from disk tray 10, held between clamper 30 and turn table 50, suspended in the air and thus made rotatable in this state. Specifically, motor 105 drives and rotates turn table 50 so as to rotate disk D.

Figure 7A:
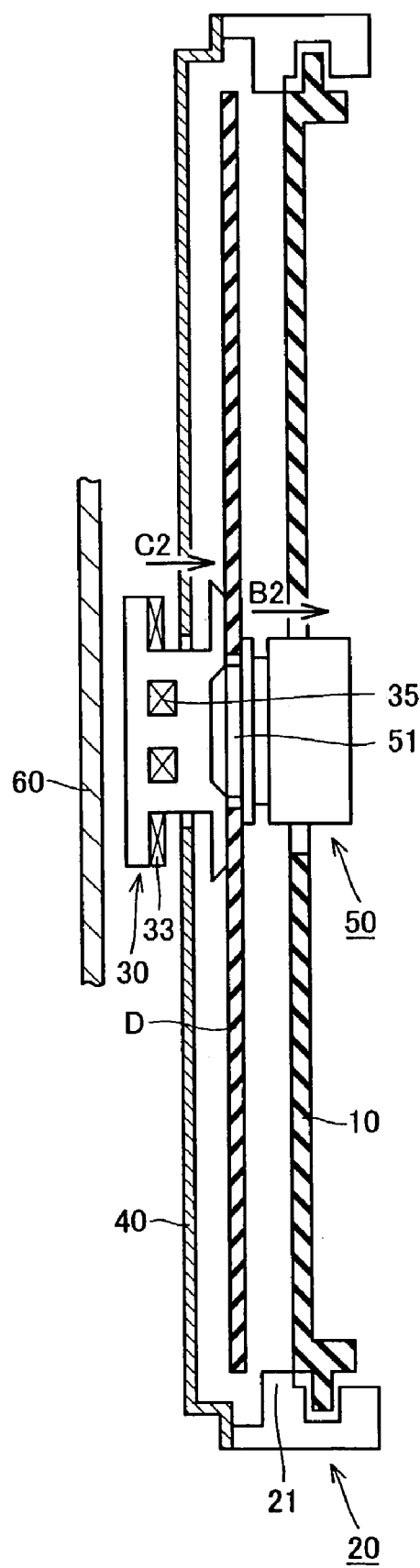
FIGS. 7A and 7B each show a schematic cross sectional view illustrating a chucking cancel operation of the disk drive in FIG. 1.
Figure 7B:
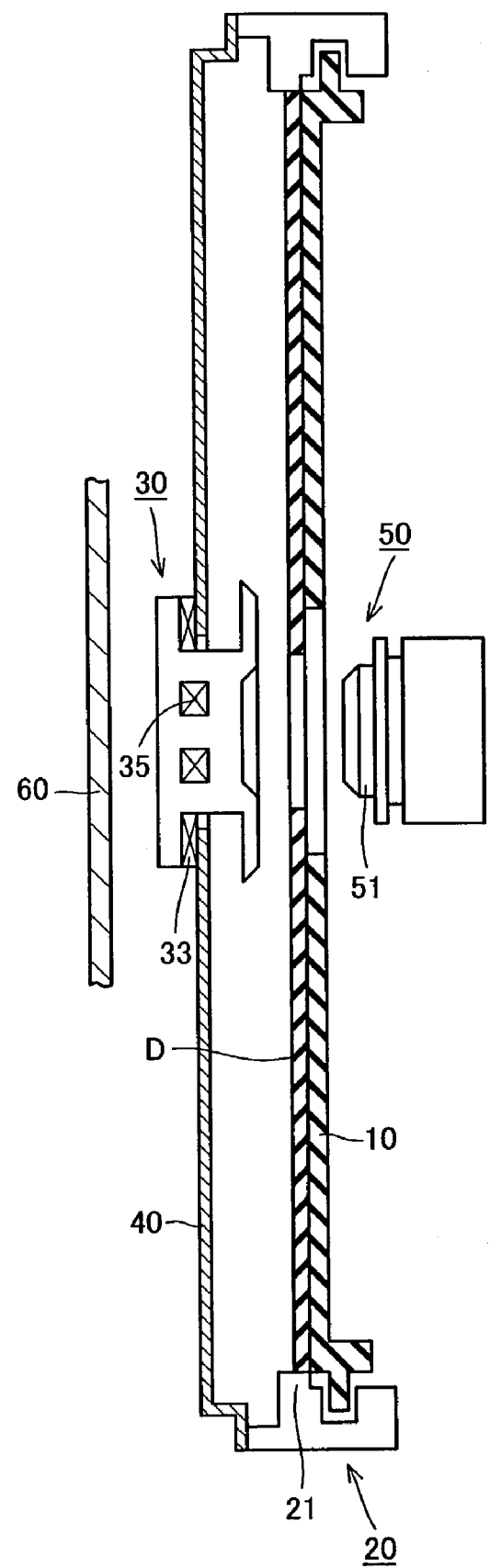

Referring next to FIGS. 7A and 7B, the chucking cancel operation is described. As shown in FIG. 7A, recording/reproduction of disk D in the chucked state is completed, and then disk D is mounted again onto disk tray 10 by the chucking cancel operation. Turn table 50 moves in the direction opposite to the direction in the chucking operation (direction indicated by arrow B2 in FIG. 7A). Clamper 30 moves in the direction indicated by arrow C2 in FIG. 7A according to the movement of turn table 50. At this time, the magnetic attraction force which draws the first magnet 33 onto clamper support member 40 is added to cause clamper 30 to reach the position closest to disk tray 10 in the range in which clamper 30 is movable. In this embodiment, the movement of clamper 30 is limited at the position at which the first magnet 33 contacts clamper support member 40 and thus clamper 30 reaches the position shown in FIG. 7B.

On the other hand, as disk D fits on disk holding unit 51 of turn table 50, disk D is moved toward disk tray 10 by turn table 50. When disk D is brought into contact with the disk mount surface of disk tray 10, disk D is separated from disk holding unit 51 of turn table 50 and accordingly held on projections 21 of frame 20 as shown in FIG. 7B.

Unloading Operation and Centering Cancel Operation

Figure 8A:
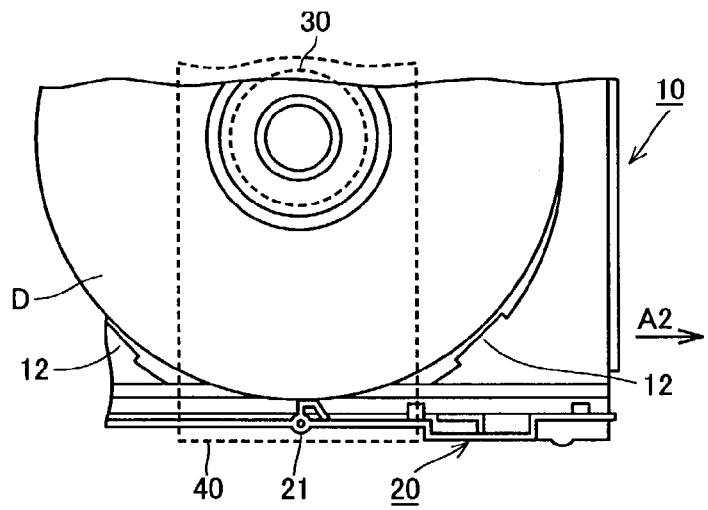
FIGS. 8A–8C each show a front view of the disk drive in FIG. 1, illustrating an unloading operation and a centering cancel operation.
Figure 8B:
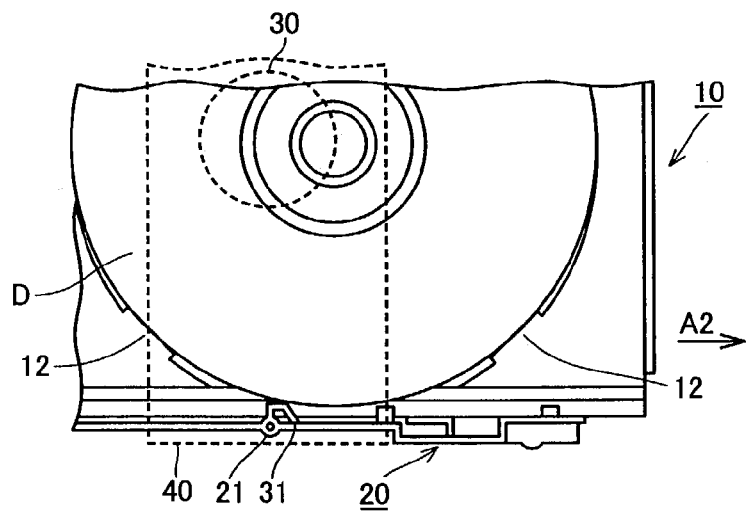
Figure 8C:
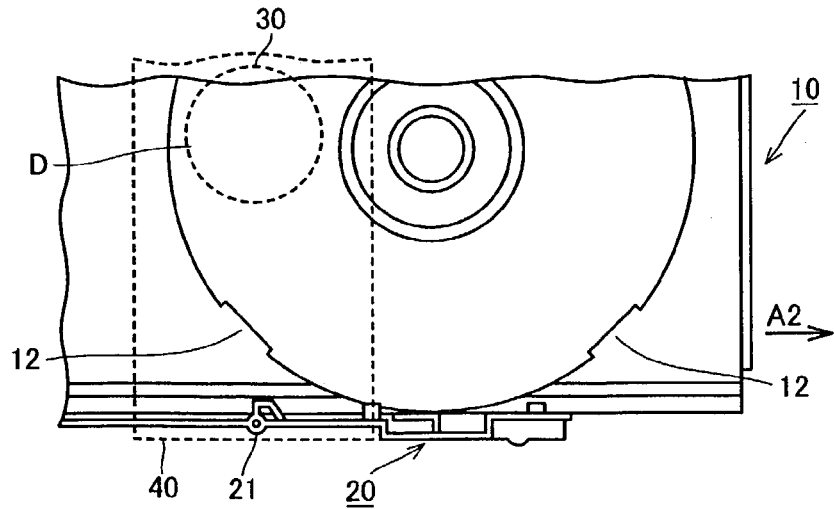
Figure 9:
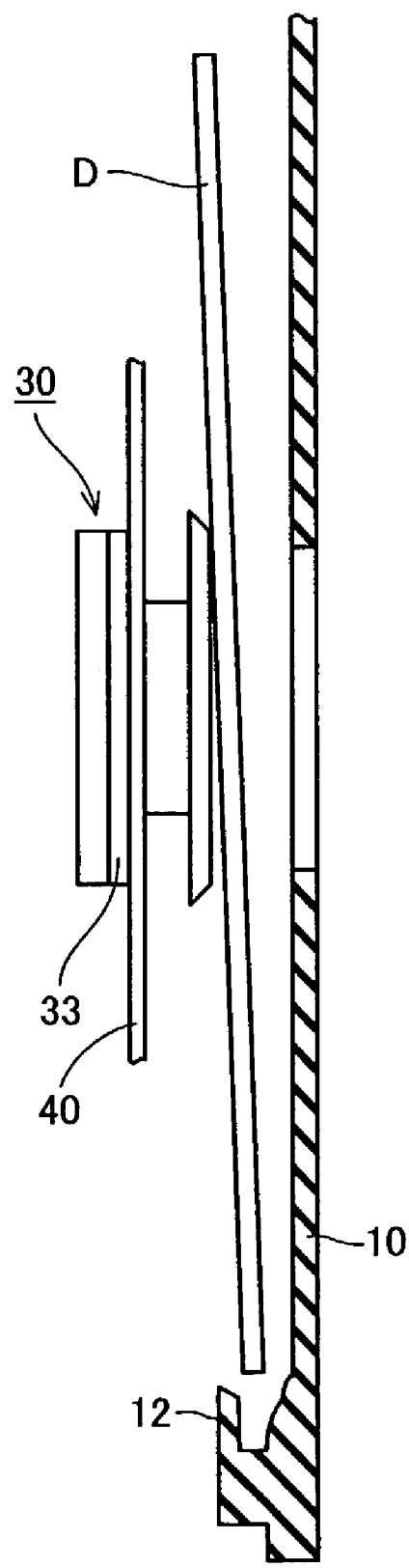
FIG. 9 schematically shows an effect of the disk drive in FIG. 1, of preventing a disk from being dropped.

Referring to FIGS. 8A–8C and 9, an unloading operation and a centering cancel operation are described. The dotted lines shown in FIGS. 8A–8C are imaginary lines representing respective outlines of clamper 30 and clamper support member 40.

As shown in FIG. 8A, disk D held on projection 21 used for centering is not caught by lugs 12. As disk tray 10 starts moving in the direction indicated by arrow A2 in FIGS. 8A–8C, disk D descends along the slope of projection 21

(see FIG. 8B). Then, disk D moves downward to be inserted into the space formed by lugs 12 provided on disk tray 10 and disk tray 10.

At this time, clamper 30 is attracted onto clamper support member 40 by the magnetic attraction force of the first magnet 33 fit in clamper 30 in disk drive 1, clamper 30 is located at the position closest to disk tray 10 in the range in which clamper 30 is movable. Accordingly, even if disk D is tilted due to any cause, disk D contacting clamper 30 is never dropped from disk tray 10 and thus guided to the place between depression 1 and lugs 12 of disk tray 10 (see FIG. 9). In this way, disk D is surely prevented from being dropped and the unloading operation is smoothly carried out (FIG. 8C).

Operation of Host Computer Upon Power-Off

Operation of disk drive 1 is controlled by host computer 200. Host computer 200 controls disk drive 1 in such a manner that, when host computer 200 is powered off, chucking of disk drive 1 is cancelled to relieve disk D from being held between clamper 30 and turn table 50. This manner of control is described in detail below with reference to respective flow charts in FIGS. 10 and 11.

Figure 10:
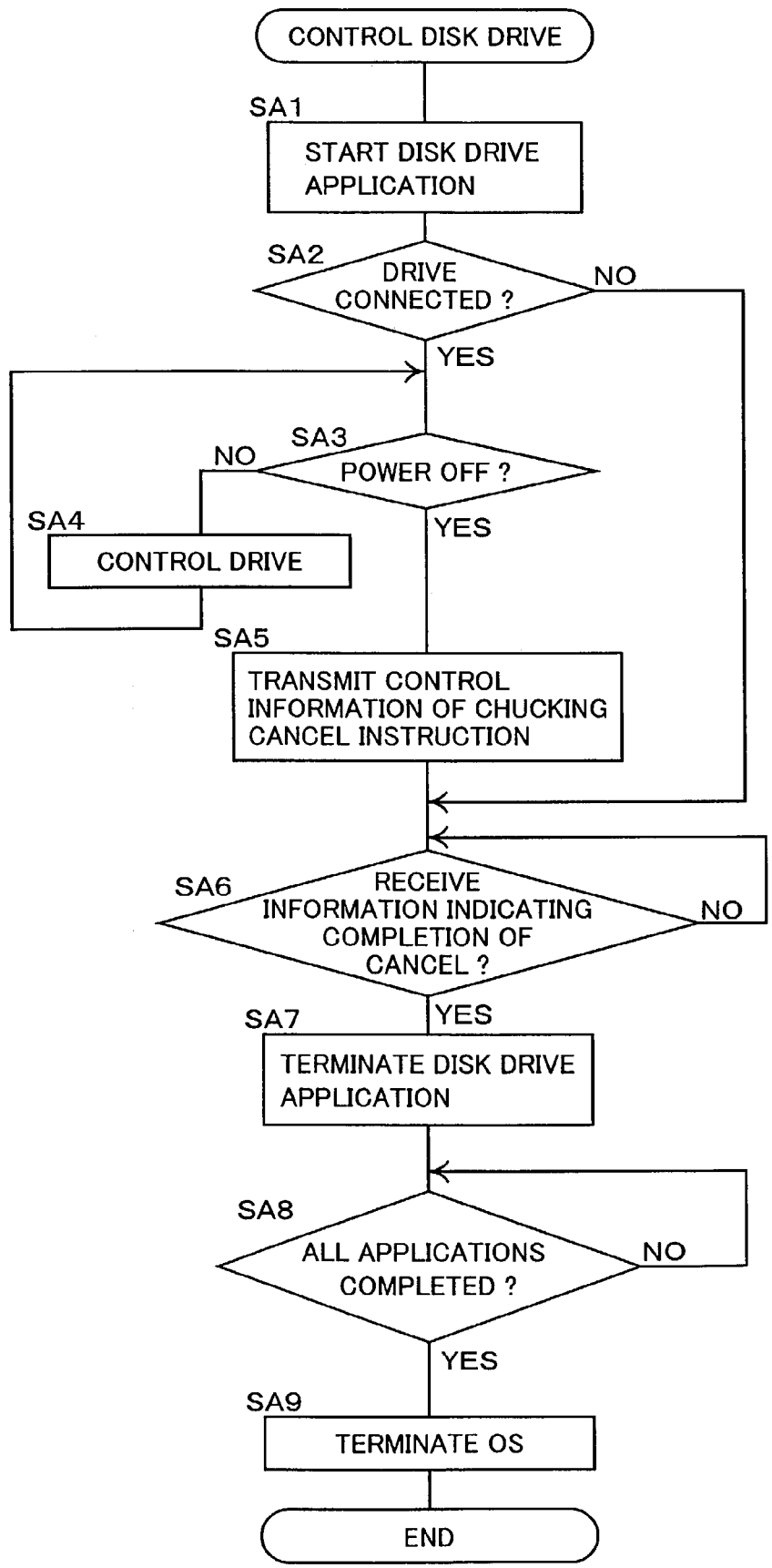
FIG. 10 is a flowchart of a disk drive control process that is followed by a CPU of the host computer to which the disk drive in FIG. 1 is connected.

Referring to FIG. 10, CPU 201 starts, in SA1, a disk drive application when the power of host computer 200 is turned on. Here, the disk drive application refers to software for controlling disk drive 1.

In SA2, CPU 201 determines whether disk drive 1 is connected to host computer 200 or not. If connected, this process proceeds to SA3. If not, the process proceeds to SA6.

In SA3, CPU 201 determines whether any action for powering off host computer 200 is performed. If such an action is not done, CPU 201 operates to control the operation of disk drive 1 according to any action performed for host computer 200 in SA4, and thereafter the process returns to SA3. If it is determined in SA3 that any action for powering off is done, the process proceeds to SA5.

In SA5, CPU 201 transmits, to disk drive 1, control information to the effect that chucking should be canceled.

Figure 11:
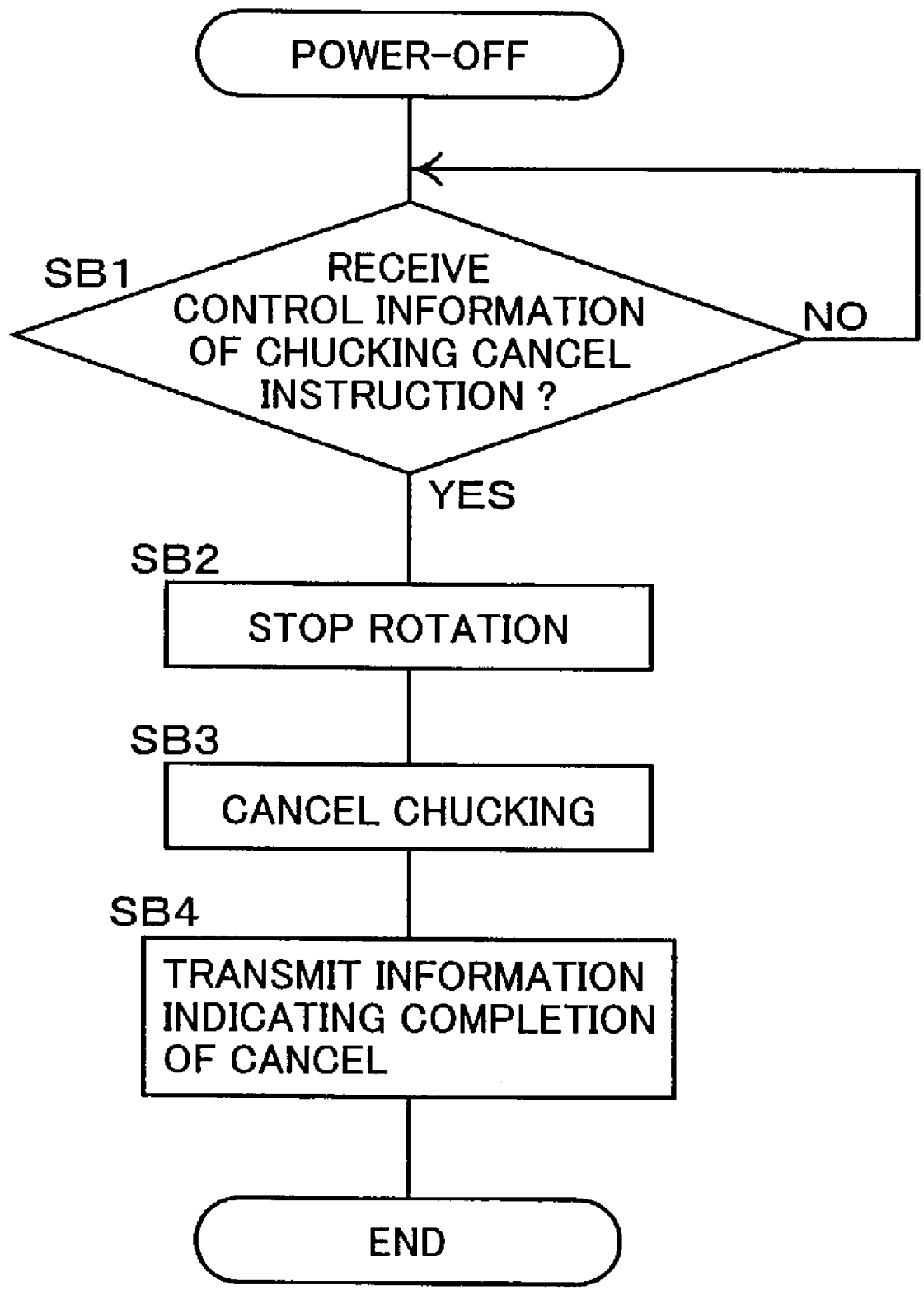
FIG. 11 is a flowchart of a process upon power-off that is followed by a CPU of the disk drive in FIG. 1.

Referring to FIG. 11, CPU 101 of disk drive 1 receives from host computer 200 the control information to the effect that chucking should be cancelled in SB1, and stops drive of motor 105 to stop rotation of disk D in SB2. In SB3, CPU 101 cancels chucking of disk D as discussed in connection with FIGS. 7A and 7B. Then, in SB4, CPU 101 transmits to host computer 200 information to the effect that chucking has been cancelled.

In SA6, CPU 201 of host computer 200 determines that the information to the effect that chucking has been cancelled is received from disk drive 1. Then, in SA7, CPU 201 terminates the disk drive application started in SA1.

In SA8, when CPU 201 determines that all applications started in host computer 200 are completed, CPU 201 terminates OS (Operating System) to end the process.

According to the embodiment as discussed above, the disk drive is described as the one which records/reproduces data on/from the disk which is chucked in the upright position. The present invention, however, is not limited to this and is applicable to any disk drive which performs recording/reproduction for the disk chucked in horizontally laid state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus comprising:
   a compact disk drive comprising:
      a rotatably structured turn table;
      a clamper rotatably holding a compact disk by holding the compact disk between said turn table and said clamper;
      a disk tray for holding the compact disk when the compact disk is not between said turn table and said clamper; and
      a control unit controlling respective operations of said turn table and said clamper; and
   a control device external to said compact disk drive and configured to:
      start an application for controlling said compact disk drive when power of said control device is turned on,
      instruct said compact disk drive to cause said control unit to cancel the holding of the compact disk by said turn table and said clamper when the power of said control device is turned off, and
      terminate the application for controlling said compact disk drive when said control device receives information from said compact disk drive to the effect that the holding of the compact disk has been canceled.

2. A control method for a compact disk drive including a rotatably structured turn table operating under control by information transmitted from a control device, a clamper rotatably holding a compact disk by holding the compact disk between said turn table and said clamper, a disk tray for holding the compact disk when the compact disk is not between said turn table and said clamper, and a control unit controlling respective operations of said turn table and said clamper, comprising the steps of:
   starting an application for controlling said compact disk drive when power of said control device is turned on;
   instructing said compact disk drive to cause said control unit to cancel the holding of the compact disk by said turn table and said clamper when the power of said control device is turned off; and
   terminating the application for controlling said compact disk drive when information is received from said compact disk drive to the effect that the holding of the compact disk has been cancelled,
   wherein said control device is external to said compact disk drive.

3. A computer readable medium for controlling a compact disk drive including a rotatably structured turn table operating under control by information transmitted from a control device, a clamper rotatably holding a compact disk by holding the compact disk between said turn table and said clamper, a disk tray for holding the compact disk when the compact disk is not between said turn table and said clamper, and a control unit controlling respective operations of said turn table and said clamper, comprising computer executable instructions to enable said control device executing the instructions to:
   start an application for controlling said compact disk drive when power of said control device is turned on;
   instruct said compact disk drive to cause said control unit to cancel the holding of the compact disk by said turn table and said clamper when the power of said control device is turned off; and
   terminate the application for controlling said compact disk drive when information is received from said compact disk drive to the effect that the holding of the compact disk has been cancelled, wherein said control device is external to said compact disk drive.

4. An apparatus comprising:
a compact disk drive comprising:
   a chucking member rotatably holding a compact disk;
   a chucking control unit controlling operation of said chucking member; and
   a disk tray for holding the compact disk when the compact disk is not held by said chucking member; and
a control device external to the compact disk drive,
wherein said control device causes said chucking control unit to cancel the holding of the compact disk by said chucking member when power of said control device is turned off; and
wherein said control device terminates an application for controlling the compact disk drive when the disk drive sends information that the holding of the compact disk has been cancelled.

5. A control method for a compact disk drive including a chucking member operating under control by information transmitted from a control device and rotatably holding a compact disk, a chucking control unit controlling operation of said chucking member, and a disk tray for holding the compact disk when the compact disk is not held by said chucking member, comprising:
causing said chucking control unit to cancel the holding of the compact disk by said chucking member when power of said control device is turned off, and
terminating an application for controlling the compact disk drive when the disk drive sends information that the holding of the compact disk has been cancelled,
wherein said control device is external to said compact disk drive.

6. A computer readable medium for controlling a compact disk drive including a chucking member operating under control by information transmitted from a control device and rotatably holding a compact disk, a chucking control unit controlling operation of said chucking member, and a disk tray for holding the compact disk when the compact disk is not held by said chucking member, comprising computer executable instructions to enable said chucking control unit executing the instructions to:
cancel the holding of the compact disk by said chucking member when power of said control device is turned off; and
terminate an application for controlling the compact disk drive when the disk drive sends information that the holding of the compact disk has been cancelled,
wherein said control device is external to said compact disk drive.

* * * * *